June 15, 1926.  
E. H. HANEY  
1,588,681  
COMBINED AUTOMATIC HAYRAKE AND HAY BALER  
Filed June 16, 1925      4 Sheets-Sheet 3

INVENTOR  
Edwin H. Haney  
BY  
ATTORNEY

June 15, 1926.  
E. H. HANEY  
1,588,681  
COMBINED AUTOMATIC HAYRAKE AND HAY BALER  
Filed June 16, 1925   4 Sheets-Sheet 4

INVENTOR  
Edwin H. Haney  
BY  
ATTORNEY

Patented June 15, 1926.

1,588,681

UNITED STATES PATENT OFFICE.

EDWIN H. HANEY, OF YAKIMA, WASHINGTON.

COMBINED AUTOMATIC HAYRAKE AND HAY BALER.

Application filed June 16, 1925. Serial No. 37,503.

This invention relates to improvements in agricultural implements, and particularly to one used in the handling of hay.

The principal object of my invention is to provide in one implement a means for raking and gathering the cut hay from the ground, and a baler to which the rake directly delivers.

This will do away with raking, cocking the hay and pitching it onto the wagons; and forming it into hay stacks, and then taking it to the hay baler.

My invention will therefore represent a great saving in labor in this particular field, which is a large one.

The cost of handling a hay crop will therefore be greatly lessened and at the same time the work will be expedited.

Another great advantage of my device lies in the fact that with its use all the leaves on alfalfa hay, which are now frequently lost owing to excessive handling, will be retained with the hay. Again, the hay will be kept free from the dirt and dust which is now blown into it while standing in stacks or hay cocks.

A further object of this invention is to provide balers on a common wheel supported frame, and a single rake or conveyor to deliver the hay to the balers. The frame is adapted to be moved along the ground by a tractor or other draft means, and a mechanism is so arranged on the apparatus so that hay will be delivered to only one baler at a time from the common conveyor. Thus while one bale is being tied another one would be in the process of formation, enabling a great number of bales to be turned out without loss of time and with a minimum force of men.

A further object is to provide platforms onto which the tied bales are moved from the respective balers, so arranged that they will automatically deflect and dump the bales onto the ground only with the weight of a full sized bale thereon. This will give the workers a good check on the weight of the bales being turned out, and will eliminate any manual lifting or other handling of the bales.

These objects I accomplish by means of such structure and relative arrangement of parts as will fully appear by a perusal of the following specification and claims.

In the drawings similar characters of reference indicate corresponding parts in the several views.

Referring now more particularly to the characters of reference on the drawings, the numeral 1 denotes a horizontal frame supported by wheels 2 of suitable character.

Figure 3:
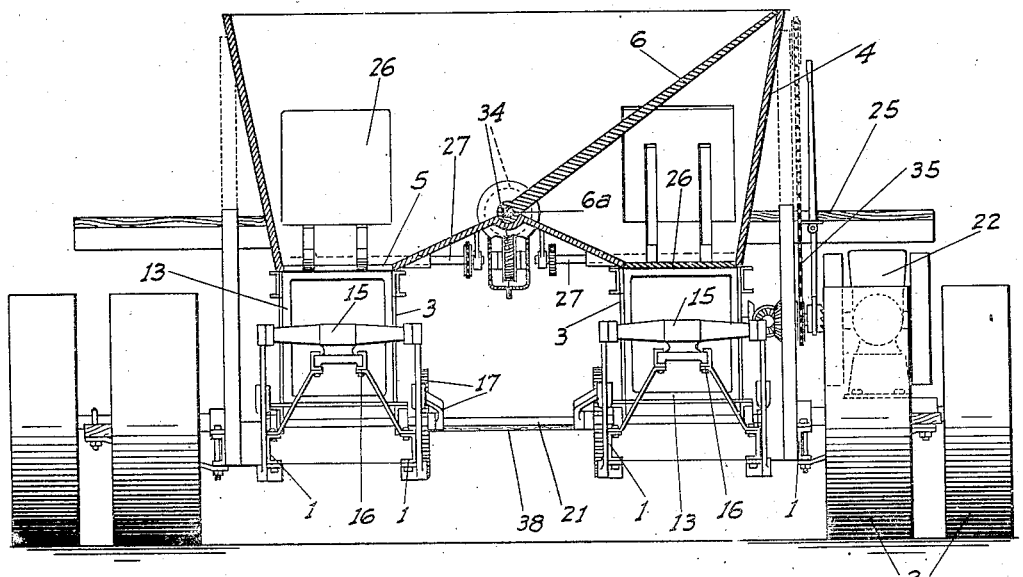
Fig. 3 is a front view partly in section, and with the conveyor removed.
Figure 4:
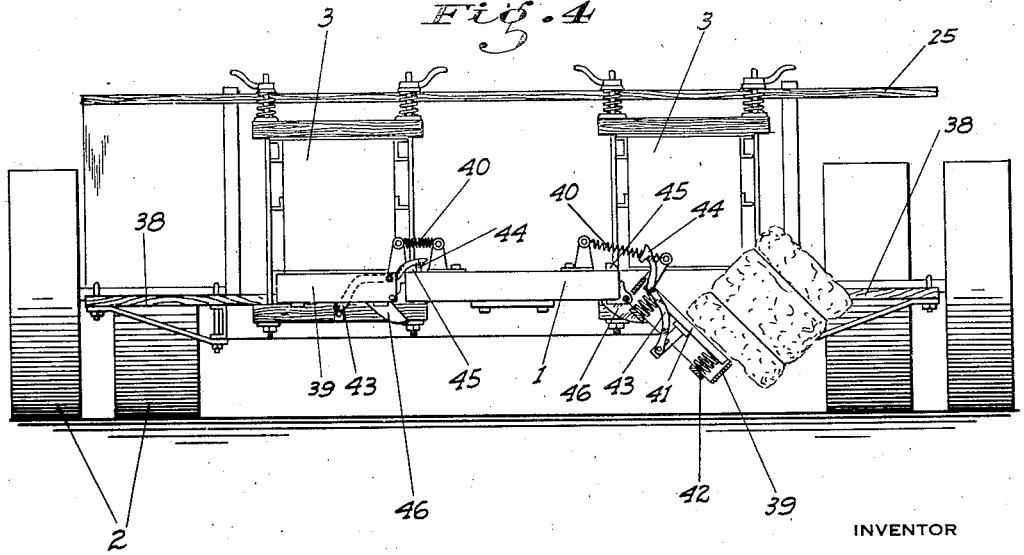
Fig. 4 is a rear end view of the device.
Figure 5:
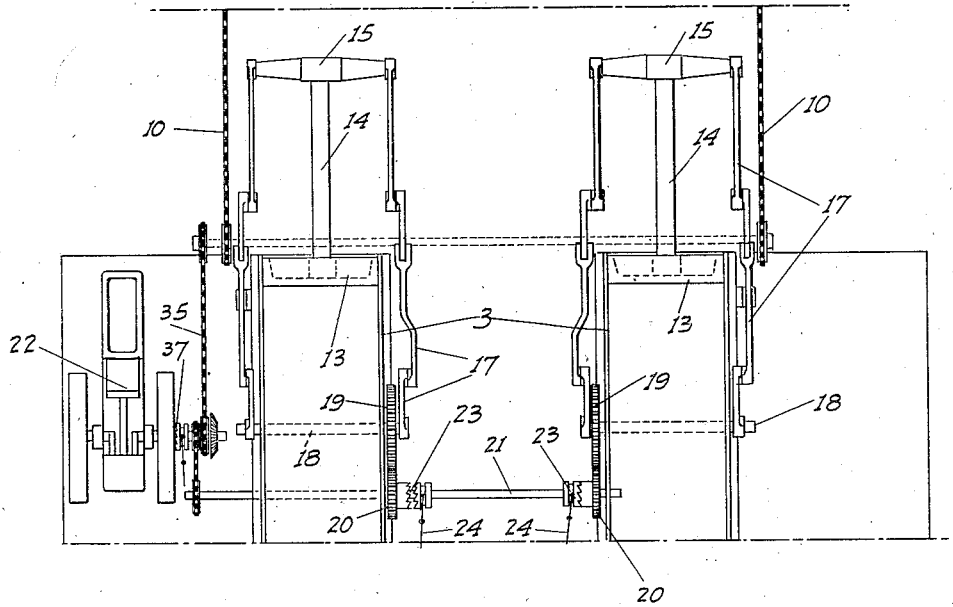
Fig. 5 is a diagrammatic plan of the plunger operating mechanism.
Figure 6:
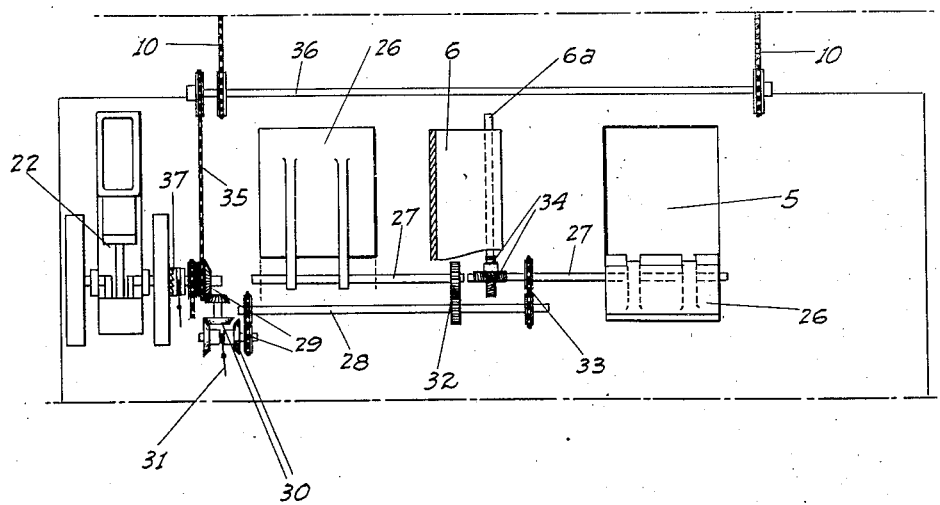
Fig. 6 is a similar view of the hopper door and partition operating mechanism.

Mounted on the frame in transversely spaced relation are balers 3 of any standard type. At the forward ends of the balers are hoppers 4, having bottom openings 5 leading to the corresponding baling chambers. The hoppers are interconnected and practically form a single member. Hinged on a longitudinal axis centrally between the openings 5 is a partition 6, adapted to be swung to one side or the other and to then rest against the corresponding side wall of the hopper, as in Fig. 3.

Thus it will be seen that hay dumped into the hopper can only pass to one of the openings 5 at a time, depending to which side of the hopper the partition is swung.

Pivotally mounted adjacent the upper and forward end of the hopper on uprights 7 provided as part of the frame is an elevator 8. This elevator extends downwardly at an angle to the ground to pick up hay on the ground ahead of the machine and deliver it to the hopper. The elevator may be of any suitable form. I prefer, however, using one consisting of a canvas belt 9 mounted on chains 10.

Rods 10ª extend between the chains at intervals from which teeth or prongs 11 project outwardly to catch and rake up the hay.

Sprocket wheels are of course provided at the upper and lower ends of the elevator about which the belt and chains pass. Suitable suspension means 12, capable of being raised and lowered would also be provided for holding the lower end of the elevator in a predetermined position relative to the ground.

The baling chambers have the customary plunger 13. Projecting outwardly are rods 14 having cross heads 15 guided by members 16 which are mounted on the frames 1.

The plungers are individually reciprocated by any suitable mechanism. In the present instance I have shown such mechanism as comprising a lever and linkage arrangement 17 which is connected at one end to the corresponding cross head and at the other end to a shaft 18. This shaft has a gear 19 thereon driven by a pinion 20. The pinions for both gears are loosely mounted on a common shaft 21 which is driven from a gas engine 22 or the like mounted on the frame 1 on the outer side of one of the balers in substantially transverse alinement with said shaft 21. Clutch means 23 between the shaft 21 and each pinion, is controlled by a lever 24 operable from any suitable point on the machine, such as for instance a platform 25 mounted above the balers to the rear of the hopper.

In this manner it will be seen that either plunger may be caused to function at the option of the operator. Should it be desired, brakes could be installed on the shafts 18 so as to enable the plungers to be held at any desired point of travel.

This arrangement of plunger driving mechanism is of course capable of variation without affecting the invention. The structure shown however enables the drive shaft 21 being placed to the rear of the baling chambers instead of ahead of the same, as usual. This allows the elevator to be placed in compact relation to the balers, which would otherwise be impossible.

For the hopper opening 5 I provide upwardly opening doors 26 which are mounted on separate shafts 27 disposed along the bottoms of the doors and along the bottom and rear of the hoppers transversely thereof.

The shafts 27 are both driven in unison but in opposite directions, to cause one door to be opened, while the other is closed.

This is done by means of a drive shaft 28 parallel to the shafts 27 and connected in driving relation with the engine 22 by a suitable mechanism indicated at 29. Double and reversible clutch means 30, preferably of the friction type, is interposed in said driving connections so as to enable the shaft 28 to be driven one way or the other at will.

This clutch means is controlled by a lever 31 projecting up through the platform 25. One of the shafts 27 is connected to the shaft 28 by gears 32, while the other shaft 27 is connected to the shaft 28 by a straight chain drive 33. The shafts 27 therefore turn in opposite directions with the rotation of the shaft 28 in one direction. One of the shafts 27 is connected to the axial shaft $6^a$ of the partition 6 by a suitable mechanism such as helical gears 34 as indicated. Therefore when said shafts 27 are rotated, the shaft $6^a$ will be rotated also, and consequently the partition will be swung to one side or the other.

Figure 1:
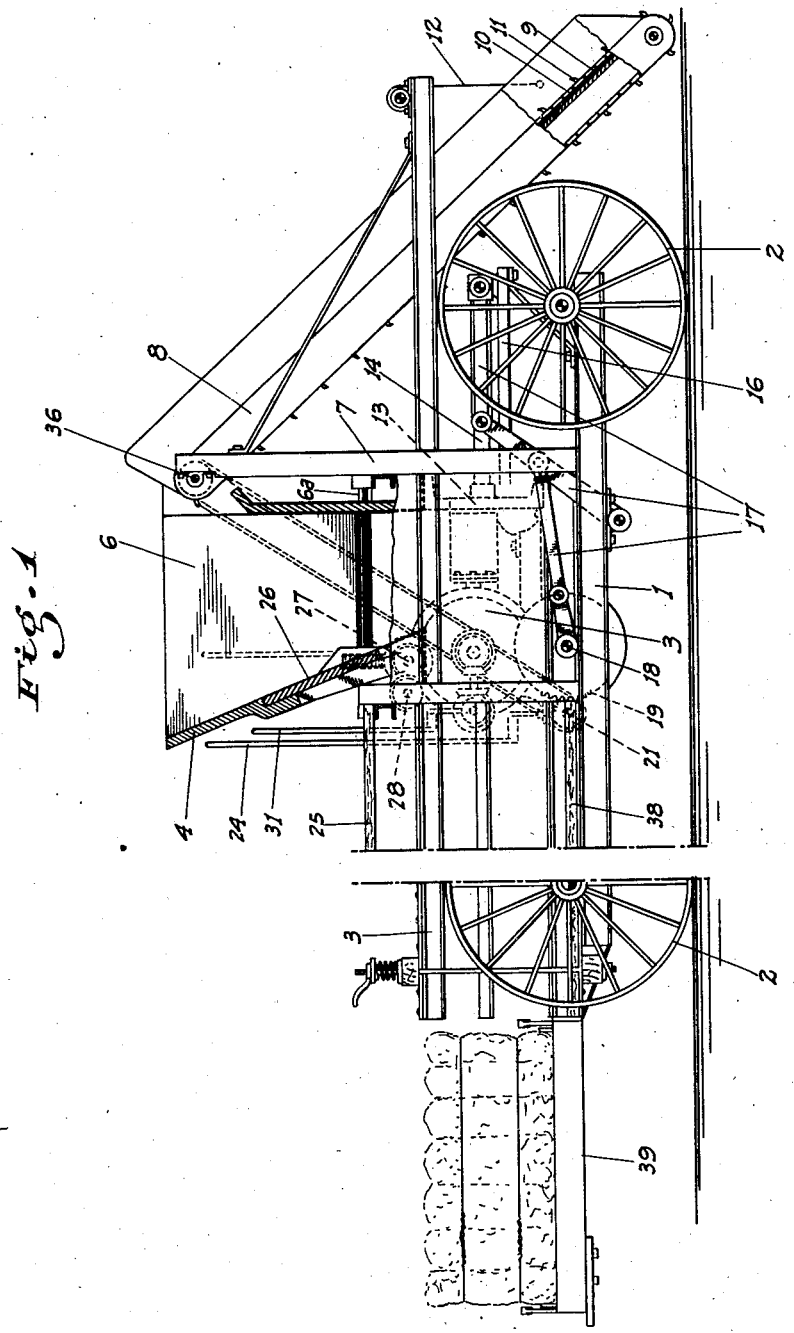
Fig. 1 is a side elevation of the machine, partly in section.
Figure 2:
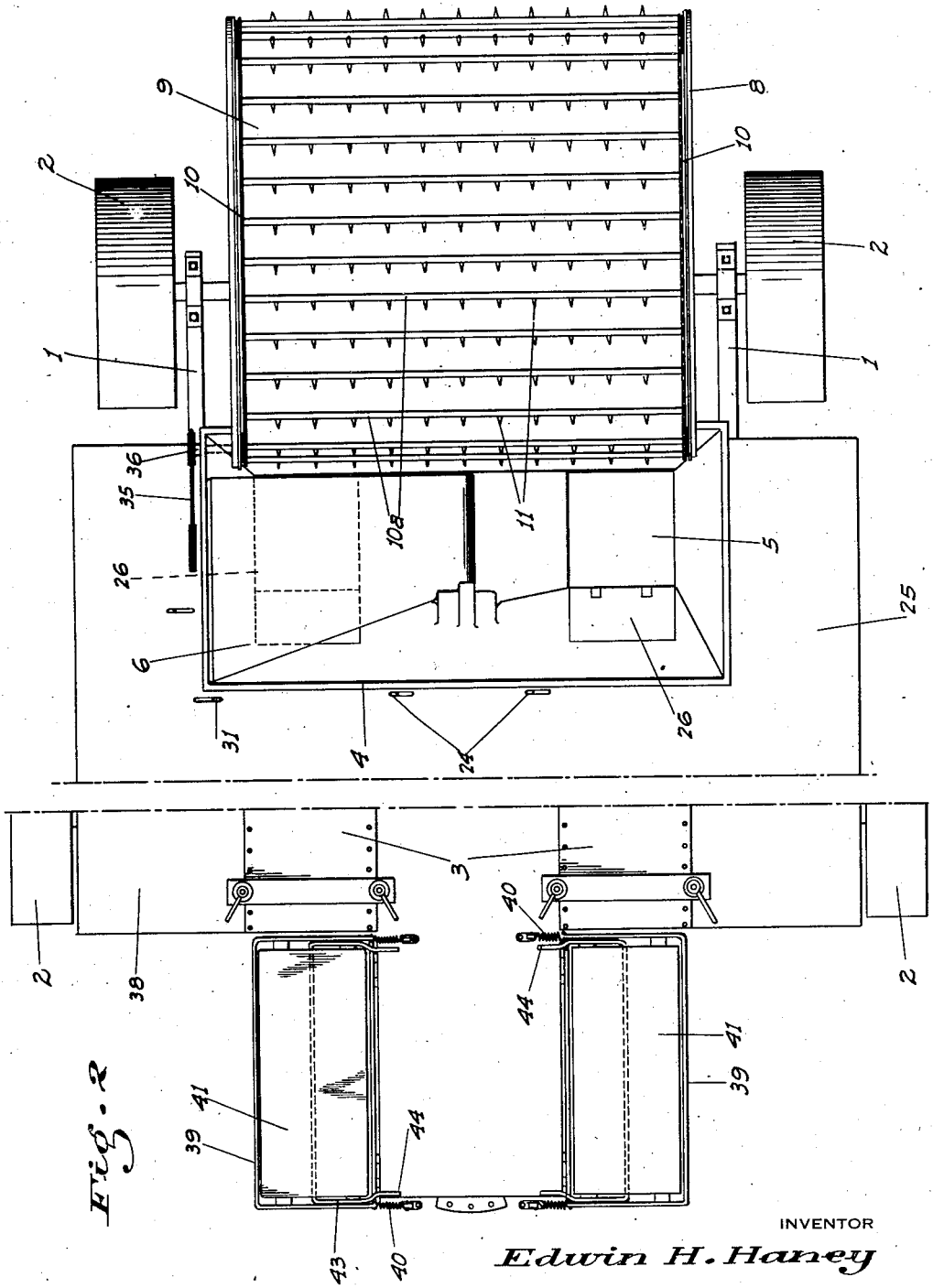
Fig. 2 is a top plan view of the same.

The connections between the shafts 27 and $6^a$ are such that when the partition is swung over to rest against one side wall of the hopper the door 26 thereunder is closed, while the other door is then fully opened and lying flush with the back wall of the hopper, as shown in Fig. 1.

When the drive shaft 28 is reversed the movement of the doors is of course reversed also, and the partition 6 will at the same time be swung toward the opposite side wall of the hopper. This opening of the doors and swinging of the partition is controlled by manipulation of the lever 31, the clutch controlled by said lever slipping if undue resistance to the movement of the doors is had, and in the event that the operator does not throw the clutch out in the proper time.

The doors retain the hay in the baling chambers so that the plungers may work to greater efficiency without tending to force the hay upwardly through the hopper openings rather than positioning it horizontally. Additional tamping means such as are commonly used may also be mounted to initially tamp the hay into the baling chambers before the doors are closed.

A chain or other drive 35 extends from the engine 22 to the shaft 36 of the upper elevator sprockets to drive the chain 10 and conveyor. The engine of course has a main clutch 37 ahead of its driving connections with the various mechanisms.

The different driving connections are capable of such variation, and still give equivalent results, that I do not feel it necessary to go into detail concerning the same, and have therefore shown such mechanisms conventionally.

In operation it will be seen that with the forward movement of the machine along the ground, and with the elevator running, hay will be gathered from the ground and delievered to the hopper. The partition 6 is set so that the hay will only go to one or the other of the baling chambers. When such chamber is full the door 26 is closed, while the partition 6 automatically swings over to the other side to allow the hay to enter the other baling chamber, the door 26 of this chamber now opened as previously described.

The plunger of the elevator is then operated to form the bale, which is pressed and tied by men on a platform 38 which is mounted on the frame 1 and extends along both sides of and between the balers. In the meantime the other baler is being loaded and by the time the first bale is ready to be discharged the hay in said other baler is ready to be formed into a bale. At the same time the first baler is then ready to receive another load of hay.

It will therefore be seen that operations may be continuously carried on without loss of time and with the services of only a single gang of bale men being necessary to handle the output of the two balers.

Hinged longitudinally of the machine onto the frame 1 to the rear of the balers are frames 39, which are adapted to tilt down laterally of the machine. These frames are normally held in horizontal positions by spring means 40 acting thereon.

Mounted in the frames 39 are platforms 41 supported by spring 42 carried by said frames. These platforms are adapted to receive the tied bales as they are discharged from the balers.

Levers 43 are disposed at both ends of each platform and are pivoted onto the corresponding frame 39. The levers are interconnected under the platform to form a unitary structure, and are arranged to be depressed by the depression of the platform. The outer ends of the lever have catches 44 adapted to overhang the frame 1 and to engage lugs 45 fixed thereon. This catch and lug arrangement in connection with the levers is such as to normally prevent downward tilting of the platforms and their frames without putting any load on the springs 40.

The catches are also so arranged that they will only be disengaged from the lugs when the platform is depressed in its frame a certain amount. The springs supporting the platform are of such strength that they will only be compressed to the necessary extent when a full weight bale is on the platform. Such a bale therefore automatically causes the catch to be released and the platform to tilt, whereupon the bale will of course slide from the platform onto the ground. When the weight of the bale is removed from the platform, the latter will be restored to a horizontal position by the action of the spring 40 and the catches reengaged with their lugs.

Downward tilting of the platforms is limited by stop members 46 on the frames 39 adapted to engage the frames 1 when the platforms have reached a predetermined tilted position.

Inasmuch as the elevator is at the front of the machine draft means to propel the same must be applied to the rear. Since the frame 1 may project rearwardly of the tilting bale platforms and between the same, a tractor or the like can readily be connected to such frame to push the machine.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A harvesting machine comprising with a pair of balers mounted in common in side by side relation, interconnected hoppers for both balers having transversely spaced bottom openings, a hay elevator common to both balers and delivering to the hoppers, closure members for said openings connected together for alternating opening and closing movement, and means whereby hay can only be delivered from the elevator to that hopper whose closure member is open.

2. A harvesting machine comprising with a pair of balers mounted in common in side by side relation, interconnected hoppers for both balers having transversely spaced bottom openings, a hay elevator common to both balers and delivering to the hoppers, closure members for said openings connected together for alternating opening and closing movement, a partition in the hoppers hinged centrally between the bottom openings and adapted to be swung to one side or the other above the closure members, connections between said partition and closure members arranged to cause the partition to be swung away from that opening whose closure member is open in timed relation with the movement of said closure members.

3. In a hay baler, a horizontal platform hinged for downward movement beyond the baler and onto which a bale from the latter is moved, and means actuated by the weight of a bale whereby said platform will tilt only when a bale of a predetermined weight is placed thereon, to then cause the bale to slide from the platform.

4. In a hay baler, a horizontal platform hinged for downward movement beyond the baler and onto which a bale from the latter is moved, means whereby said platform will automatically tilt when a bale of a predetermined weight is placed thereon to cause the bale to slide from the platform, and means causing said platform to resume its normal position when the weight is removed therefrom.

5. In a hay baler, a horizontal platform hinged for downward movement beyond the baler and onto which a bale from the latter is moved, a frame supporting the baler and platform, normally engaged catch means between the frame and platform, and holding the latter in a horizontal position, and means causing said catch means to be released to allow the platform to tilt actuated by and only when a predetermined weight is placed on the platform.

6. In a hay baler, a horizontal platform hinged for downward movement beyond the baler and onto which a bale from the latter is moved, a frame supporting the baler and platform, normally engaged catch means between the frame and platform, and holding the latter in a horizontal position, means causing said catch means to be released to allow the platform to tilt actuated by and only when a predetermined weight is placed on the platform, and spring means causing the platform to be returned to its normal position, and the catch reengaged, when the weight is removed from the platform.

In testimony whereof I affix my signature.

EDWIN H. HANEY.